US012265465B2

(12) United States Patent
Viola et al.

(10) Patent No.: US 12,265,465 B2
(45) Date of Patent: Apr. 1, 2025

(54) SYSTEM AND METHOD FOR AUTO-GENERATION OF TEST SCRIPTS

(71) Applicant: GE Aviation Systems LLC, Grand Rapids, MI (US)

(72) Inventors: Michael A. Viola, Grand Rapids, MI (US); Jacob E. Drehobl, Grand Rapids, MI (US)

(73) Assignee: GE Aviation Systems LLC, Grand Rapids, MI (US)

(*) Notice: Subject to any disclaimer, the term of this patent is extended or adjusted under 35 U.S.C. 154(b) by 17 days.

(21) Appl. No.: 17/733,807

(22) Filed: Apr. 29, 2022

(65) Prior Publication Data

US 2023/0350790 A1   Nov. 2, 2023

(51) Int. Cl.
*G06F 11/36* (2006.01)
*G06F 11/3668* (2025.01)

(52) U.S. Cl.
CPC ...... *G06F 11/3684* (2013.01); *G06F 11/3688* (2013.01); *G06F 11/3692* (2013.01)

(58) Field of Classification Search
CPC ....... G06F 11/36–3696; G06F 11/3013; G05B 23/00–0297
See application file for complete search history.

(56) References Cited

U.S. PATENT DOCUMENTS

| 6,161,216 A | 12/2000 | Shagam |
| 8,332,504 B2* | 12/2012 | Ling ...................... G06F 11/22 703/22 |
| 9,135,147 B2 | 9/2015 | Artzi et al. |
| 9,952,855 B2 | 4/2018 | Finnie |
| 10,013,338 B2* | 7/2018 | Leclair ...................... G06F 9/44 |

(Continued)

FOREIGN PATENT DOCUMENTS

| CN | 102541735 A | 7/2012 |
| EP | 3040864 | 7/2016 |
| WO | 200552793 | 6/2005 |

OTHER PUBLICATIONS

Extended European Search Report for corresponding European Patent Application No. 23159526.5 mailed Sep. 22, 2023, 9 pages.

(Continued)

*Primary Examiner* — Todd Aguilera
(74) *Attorney, Agent, or Firm* — Enang Akan; Darrow Mustafa PC (57) ABSTRACT

Provided is a system communicatively coupled to a network including a plurality of aviation assets. The system includes a processor; a memory including instructions which when executed by the processor cause the processor to perform operations including detecting a change in a state of the network, the change being characterized by comparing a previous state of the network with a current state of the network, and the change being associated with one or more assets of the plurality of assets. The operations also include fetching configuration data and test data from a plurality of sources, the fetching being responsive to detecting the change; generating, based on the change, the configuration data, the test data, one or more verification scripts; and executing a specified test utilizing the one or more verification scripts, the specified test being configured to analyze one or more assets of the plurality of aviation assets.

10 Claims, 4 Drawing Sheets

(56) References Cited

U.S. PATENT DOCUMENTS

| | | | |
|---|---|---|---|
| 10,120,785 B2 | 11/2018 | Meyers | |
| 11,102,081 B1* | 8/2021 | Tiwari | H04L 67/51 |
| 11,474,929 B2* | 10/2022 | Watson | G06F 11/3684 |
| 2007/0157174 A1 | 7/2007 | Gebhardt et al. | |
| 2008/0155513 A1* | 6/2008 | Ling | G06F 11/3696 |
| | | | 717/135 |
| 2011/0047529 A1 | 2/2011 | Randimbivololona | |
| 2013/0123952 A1 | 5/2013 | Reid et al. | |
| 2013/0232474 A1* | 9/2013 | Leclair | G06F 11/3668 |
| | | | 717/134 |
| 2017/0322868 A1 | 11/2017 | Hotra et al. | |
| 2020/0310947 A1* | 10/2020 | Watson | G06F 11/3684 |
| 2022/0343767 A1* | 10/2022 | Galindo | G08G 5/003 |

OTHER PUBLICATIONS

Zafar et al., "A Model-Based Test Script Generation Framework for Embedded Software", 2021 IEEE International Conference on Software Testing, Verification and Validation Workshops (ICSTW), 2021, pp. 192-198.

* cited by examiner

SYSTEM AND METHOD FOR AUTO-GENERATION OF TEST SCRIPTS

TECHNICAL FIELD

The embodiments relate to the fields of aviation and engine performance assessment.

BACKGROUND

When managing a fleet of assets, there typically exists a verification team that implements test procedures and verification scripts to analyze and validate the operation of one or more assets in the fleet. Analysis and verification can include receiving data relating to one or more parts in an individual asset. As such, verification (or test) scripts can include models, test procedures, and inference models that can indicate, after running on sensor or measurement data received, whether a component or an asset has failed, whether the component or the asset will fail (and if so at what predicted time), and whether the part component or the asset needs to be scheduled for service (and if so, at what time).

Verification scripts thus include a wide variety of functionalities, and they typically are custom-made (even when they are automatically generated) based on the asset or the component for which they are designed.

For instance, when managing a fleet of aircrafts or aircraft components, a typical test script auto-generation tool can take one or more inputs from Aircraft Configuration Toolset (ACT) Interface Control Document (ICD) creations, Virtual Aircraft Integration System (VAIS) configuration generations, and C919 Onboard Maintenance System (OMS) Member System Data Entry Tools (DET) to generate VAIS verification scripts. The scripts are used to perform test procedures for C919 OMS system level testing.

This testing is required during every block point, and it is required for the block point delivery to customers. As such, test procedures must be regenerated at each block point to meet specific needs and to regenerate new test scripts. Thus, the state-of-the-art in implementing verification scripts is a complex process that can require a significant amount of engineering time and resources.

BRIEF DESCRIPTION OF THE DRAWINGS

The accompanying drawings, which are incorporated herein and form part of the specification, illustrate the present disclosure and, together with the description, further serve to explain the principles of the present disclosure and to enable a person skilled in the relevant art(s) to make and use the present disclosure.

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
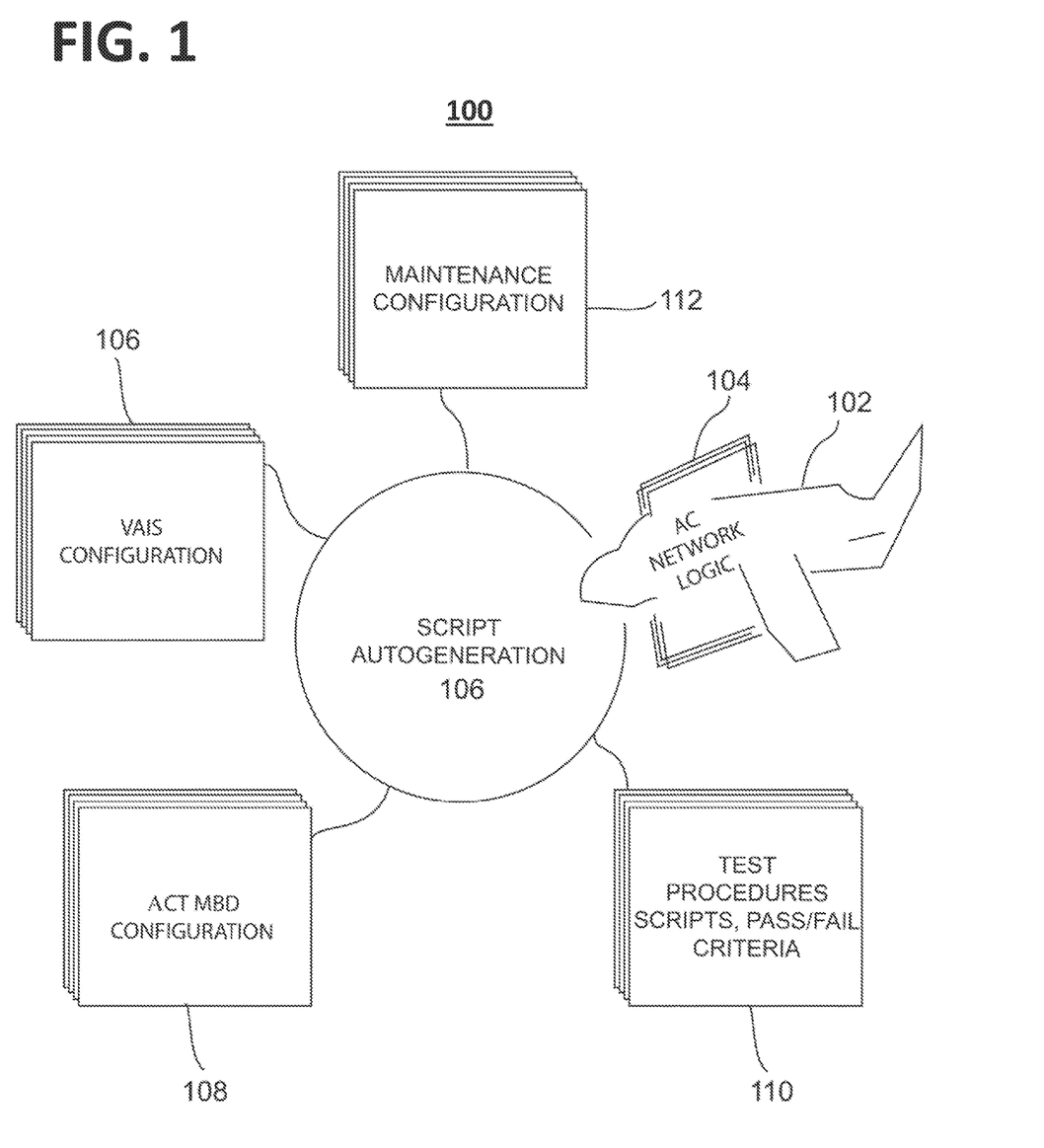
FIG. 1 illustrates an exemplary system according to an embodiment of the present disclosure.

FIG. 1 illustrates a system 100 according to one exemplary embodiment. The system 100 may include a plurality of devices that are communicatively coupled via a network. The network may support connectivity protocols that are wireless or wired. Without loss of generality, communication may be achieved in the network via a private area network, the Internet, or secured line-of-sight communication networks. Furthermore, devices in the network may be edge devices, servers, data centers that include storage units, processors for executing instructions that impart application-specific functionality to the devices.

The system 100 can include a plurality of aircraft 102. Each aircraft 102 may have an onboard aircraft network logic (AC NETWORK LOGIC) 104. This local network may feature traffic data from sensors, components, systems, subsystems of the aircraft. As such, the local network of the aircraft may include a state variable that characterize the traffic on the network at any given time, and this state variable may be probed or interpreted to yield insight as to the current condition of the aircraft or the current condition of one or more subsystem of the aircraft.

From probing the state variable, the system 100 can run test procedures on the data gathered from the state variable. And such test procedures can yield information relating to the state of the variable at the time of test or they may yield information relating to an anticipated time of failure of one or more component or subsystem of the aircraft.

The system 100 can be configured to perform data analytics that include probabilistic determinations based on the state variable of particular aircraft and/or the state variables of other aircraft, to estimate the performance, time of service, or time of failure of the particular aircraft or of one of its components.

Such estimations are based on running verification test scripts that are auto-generated by a script autogeneration module 106. The script autogeneration module 106 may include one or more processors that are configured to fetch and receive data from the local network logic 104 and based on the traffic detected on the network logic 104, establish a series of instructions (or a script) that codify a test procedure for the aircrafts 102 from which the data were fetched and received.

Generating this script can include comparing the fetched and received data with data that were obtained in a previous cycle. Such data may include previously established test procedures, scripts, pass/fail criteria that are logged or stored in a module 110 that is communicatively coupled to the script autogeneration module. Similarly, generating the verifications script may include comparing the fetched and received data with previously stored information in a ACT Model-Based Development toolset (MBD) configuration database 108, a VAIS configuration database 106, and a maintenance configuration database 112.

For example, and not by limitation, the script autogeneration module 106 can take input from ACT ICD creation and VAIS configuration generation and C919 OMS Member System DET generation modules to generate VAIS scripts that are used to conduct test procedures for C919 OMS system level testing. Such testing is required during every block point and is required for the block point delivery to customers. The script auto-generation module 106 can be configured to allow a verification entity to keep the same test procedures and only regenerate the scripts after each block point ICD update.

For example, an ICD may be independently updated to reflect entirely new or modified instructions. Typically, an ICD may have an amount of lines or an amount of data that cannot be easily processed by a human user. In the state-of-the-art, despite this difficulty, a human user has to read through the new ICD and generate new test scripts manually. For example, an ICD may include hundreds of thousands of lines.

In contrast to the state-of-the-art, the script autogeneration module 106 may be configured to parse through a new ICD and perform a comparison with historical version of that same ICD, and upon the comparison yielding that there is at least one difference between the new ICD and a historical version thereof, the script autogeneration module 106 may then be configured to regenerate the test scripts so that they conform with the new ICD.

In one implementation, the script autogeneration module 106 may receive an instruction to check whether an ICD has change and regenerate the scripts as described above. In an alternate implementation, the script autogeneration module 106 may be configured to continually check for ICD updates. In yet another implementation, the script autogeneration module may be programmed with a schedule to check ICD status and effect the generation of new scripts upon finding updates to the ICD during the status check. The above operations and implementations may be configured such that one or more ICDs are checked simultaneously.

The module 106 can thus generate thousands of scripts in minutes that would take days to generate using the typical state-of-the-art methods. The script auto-generation module 106 can further be configured to identify errors in the input such as missing connections between OMS configurations and ICD and invalid OMS member system data entry items. Furthermore, in an alternate mode of operation, every time the network is updated with a new state variable, the script auto-generation module 106 can generate a test script for each update.

The script autogeneration module 106 can be configured to use the ACT ICD Extensible Markup Language (XML) output files as input. Furthermore, the module 106 can also be configured to the VAIS project ICDIMPORT XML as input (from the database 106). Moreover, the script auto-generation module 106 can be configured to use OMS MSD XML files from each member system and parameter list XML and network map spreadsheet from C919 OMS configuration output as input. Generally, the module 106 can fetch, decode, and execute an input to generate VAIS test scripts for the following C919 OMS functions: Ground Test, Parameter Acquisition, Fault Reporting. These functions are merely exemplary and not limiting.

In one embodiment, the script autogeneration module 106 may be used to automatically create a plurality of scripts to test various features of various sub-systems, in a manner corresponding to pre-defined but flexible test procedures for the purpose of integration testing. The scripts are then run upon generation to conduct such integration testing as prescribed in aforementioned test procedures. For instance, in one use case scenario, the script autogeneration module 106 may be part of an application specific controller that is configured to intake data relating to a plurality of test procedures.

Such data may include predetermined threshold for sensors, performance targets for subsystem or system modules in one or more assets to be tested. Upon in-taking the data, the module 106 may then execute the script autogeneration module 106 to automatically create test scripts that are based on the one or more procedures. A test script may include instructions to measure signals from a set of sensors in a sub-system and compute one or more performance metric from such signals.

For example, and not by limitation, example signals may originate from a set of sensors including oil pressure sensors, temperature sensors, parking break sensors, and example performance metrics performance metrics may include determining whether the signals indicate that the measurements is above or below or threshold or in some range of interest.

The scripts that are generated may set the input value of the sensors, and they may include auto-generated criteria on the sensor's output for determining whether the test procedure has passed or whether it has failed. When the test procedure has passed, the script autogeneration module 106 may issue a report that is human-readable form and that serves as evidence of verification procedures having been undertaken. When the test procedure has failed, the report can indicate points of failure.

The script autogeneration module 106 may further be configured to compare the one or more performance metric with benchmark values associated with one or more test procedures that are inputted to the controller. Upon this comparison, the script autogeneration module 106 may issue a message or a command indicative of a remedial action for the asset under test. Such remedial action may be to flag the asset as needed for maintenance, or it may be an instruction to operate the asset in a specified regime in order to extend up time.

In yet another example embodiment, the module 106 may be configured to use inputs such as but not limited to Aircraft Configuration Toolset (ACT) Interface Control Document (ICD) creations, Virtual Aircraft Integration System (VAIS) configuration generations, and C919 Onboard Maintenance System (OMS) Member System Data Entry Tools (DET).

The script autogeneration module 106 may use these data sources to create a suite of scripts to generate large amounts of network traffic and create numerous states for the purpose of robustness testing of the system or one or more sub-systems. The suite of scripts is then run to conduct such robustness testing, and remedial actions may be taken, as described above, upon the execution of the suite of scripts.

In yet another embodiment, the script autogeneration module 106 may be executed by the controller to automatically detect discrepancies or inconsistencies between one or more of its input files, such as but not limited to Aircraft Configuration Toolset (ACT) Interface Control Document (ICD) creations, Virtual Aircraft Integration System (VAIS) configuration generations, and C919 Onboard Maintenance System (OMS) Member System Data Entry Tools (DET). The detected issues are reported by the controller to other system for investigation and mitigation of the issues.

In one example scenario describing the above-noted features regarding the input files, the script autogeneration module 106 may be configured to retrieve and load a plurality of input files in order to effect a quality control routine on the files. For instance, the script autogeneration module 106 may identify in said input files a plurality of parameters that correspond to test procedures associated to one or more scripts to be generated.

The script autogeneration module 106 may then further generate a data structure including a list of parameters for each input file. The script autogeneration module 106 may then be configured to determine whether a specified parameter in a data structure for one input file is present in the data structure for another file.

If the parameter is found in both data structures, the script autogeneration module 106 can determine whether the parameter is listed the same way in both data structures. If not, the script autogeneration module 106 may mark both input files as including a discrepancy. The script autogeneration module 106 may then generate a report indicating the discrepancy and its locations in each of the associated input files. The report may then be used to assess the quality of the input files and subsequently standardized them such that the flagged discrepancies are removed.

Figure 2:
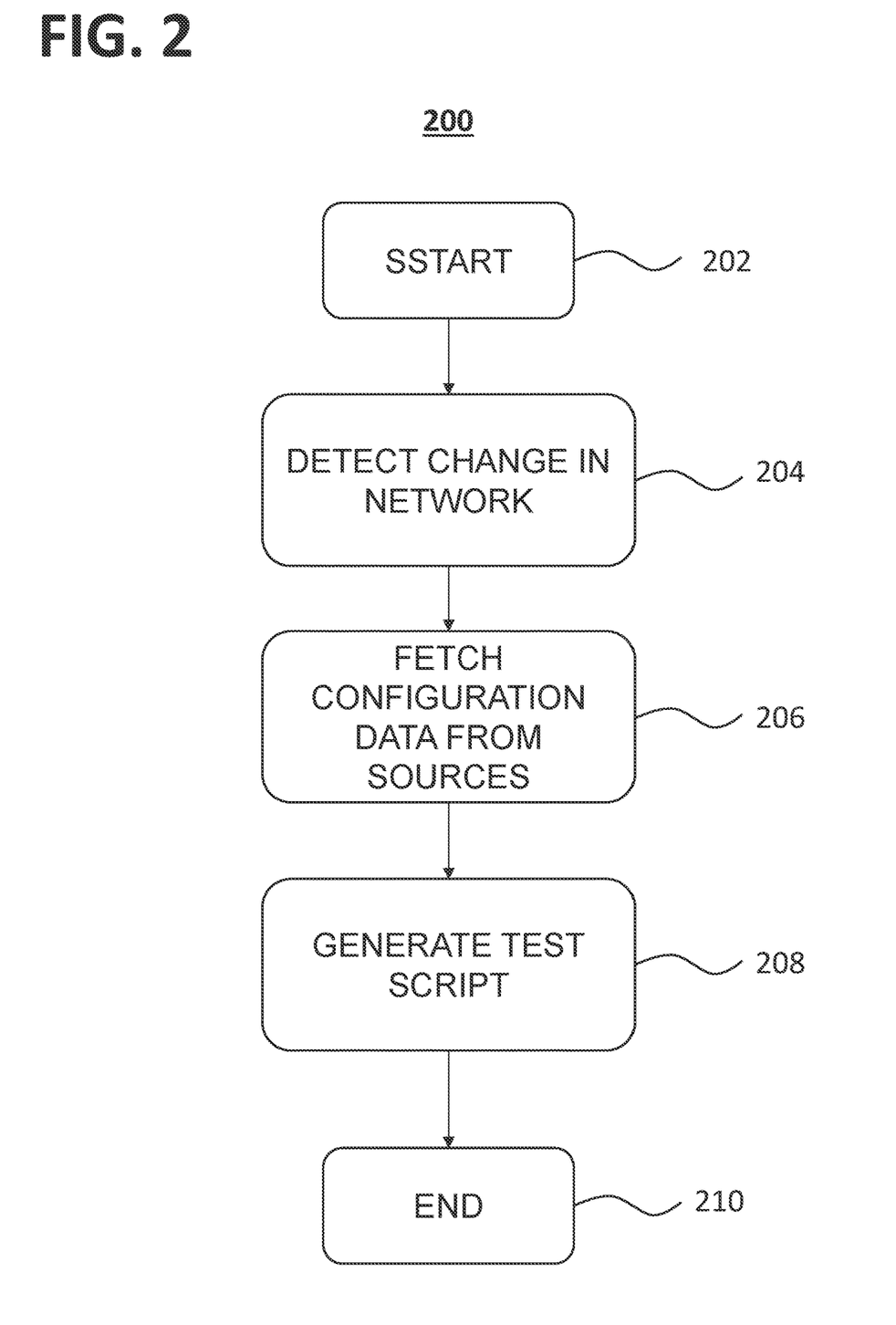
FIG. 2 illustrates an exemplary method of practicing an embodiment of the present disclosure.

FIG. 2 illustrates an exemplary method 200 according to an embodiment. The method 200 begins at block 202. At block 204, the method 200 can include detecting a change in the local aircraft network logic of an aircraft as described above. Upon detecting this change, at block 206, the method 200 can include fetching configuration data, test data, pass/fail criteria from various modules, as depicted in FIG. 1.

At block 208, the method can include generating a test script as described above. The change may be detected from the script autogeneration module 106 generate a script that is configured to issue a command for script autogeneration module to receive a measurement data 106 from one or more data associated with an asset under test. The script autogeneration module may then be configured to compare the measurement data with a predetermined threshold as specified by a historical value retrieved from a past version of an ICD input file. The method 200 can end at block 210.

Figure 3:
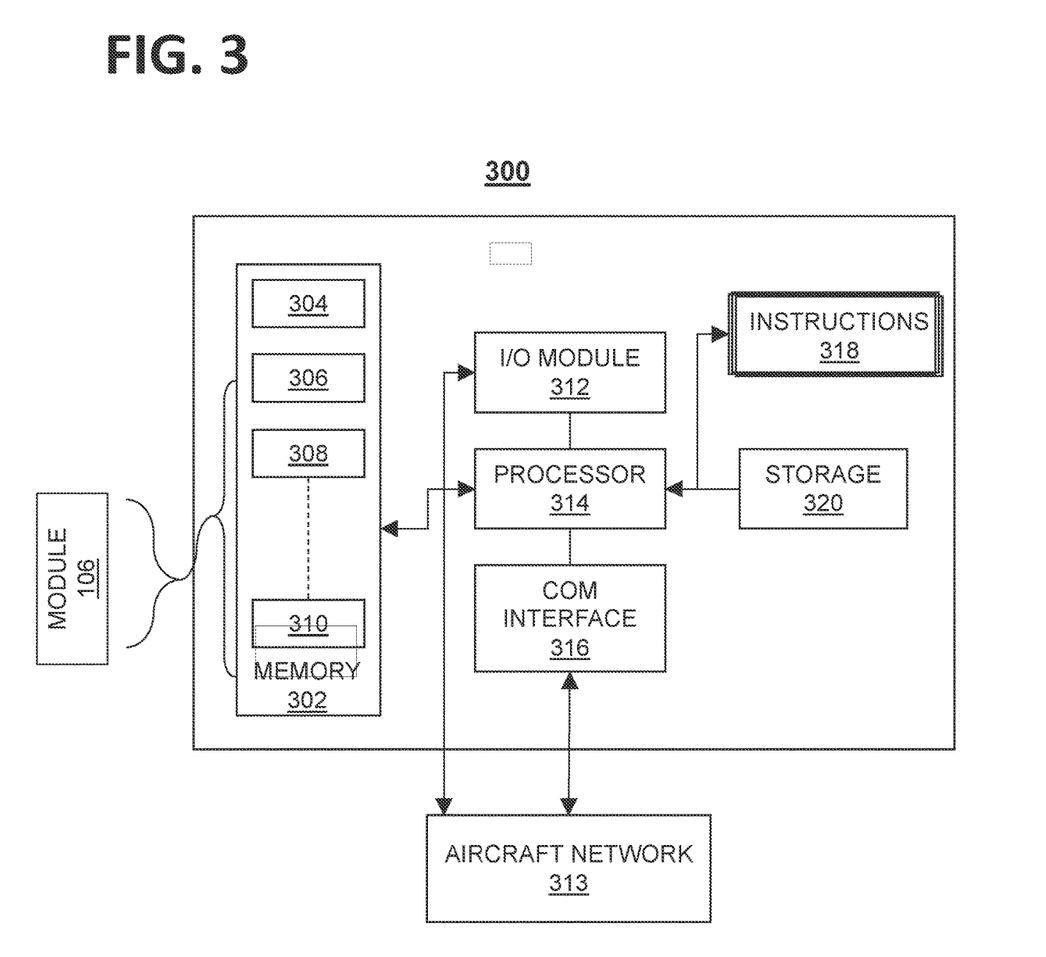
FIG. 3 illustrates an exemplary computer system upon which embodiments of the present disclosure may be implemented.

FIG. 3 illustrates a controller 300 that can include a processor 314 configured to executed one or more, or all of the blocks of the method 200 and/or the operations of the system 100 as described above with respect to FIG. 1. The processor 314 can have a specific structure. The specific structure can be imparted to the processor 314 by instructions stored in a memory 302 and/or by instructions 318 fetchable by the processor 314 from a storage medium 320. The storage medium 320 may be co-located with the controller 300 as shown, or it can be remote and communicatively coupled to the controller 300. Such communications can be encrypted.

The controller 300 can be a stand-alone programmable system, or a programmable module included in a larger system. For example, the controller 300 can be included in a verification management system such as the system 100, particularly in the script autogeneration module 106. The controller 300 may include one or more hardware and/or software components configured to fetch, decode, execute, store, analyze, distribute, evaluate, and/or categorize information.

The processor 314 may include one or more processing devices or cores (not shown). In some embodiments, the processor 314 may be a plurality of processors, each having either one or more cores. The processor 314 can execute instructions fetched from the memory 302, i.e., from one of memory modules 304, 306, 308, or 310. Alternatively, the instructions can be fetched from the storage medium 320, or from a remote device connected to the controller 300 via a communication interface 316. Furthermore, the communication interface 316 can also interface with a communicatively coupled aircraft network 313, e.g., with a network such as the aircraft network logic 104. An I/O module 312 may be configured for additional communications to or from remote systems.

Without loss of generality, the storage medium 320 and/or the memory 302 can include a volatile or non-volatile, magnetic, semiconductor, tape, optical, removable, non-removable, read-only, random-access, or any type of non-transitory computer-readable computer medium. The storage medium 320 and/or the memory 302 may include programs and/or other information usable by processor 314. Furthermore, the storage medium 320 can be configured to log data processed, recorded, or collected during the operation of controller 300.

The data may be time-stamped, location-stamped, cataloged, indexed, encrypted, and/or organized in a variety of ways consistent with data storage practice. By way of example, the memory modules 306 to 310 can form the previously described script autogeneration module. The instructions embodied in these memory modules can cause the processor 314 to perform certain operations consistent with the method 200 or the operations of the system 100 described above.

The teachings set forth herein provide several advantages for developing and deploying customized test procedures for industrial assets. For example, and not by limitation, during the development of an aircraft or during the course of its service, components or subcomponents that may need testing include the landing gear, the engine control system, the parking brake, hydraulics, and the fuel management system.

Other systems that may need testing include flight control and flight management systems, control panels and maintenance systems as well as the supporting network infrastructure. In such a case, the network structure may include Arinc 429, Arinc 825, and Arinc 664 modules with gateway hardware connecting the different networks. In this example, integration testing would be needed to demonstrate that all the systems can communicate with each other in a useful way.

For instance, the maintenance system may be used to load software and perform built-in tests on all the other systems, but only if the parking brake and landing gear were in the "maintenance allowed" position and the control panels had been switched into "maintenance allowed" mode.

In this instance, the script autogeneration module 106 may be configured to scan through the network messages and find the appropriate parameters and then build a script that may set and clear those parameters to perform the integrated testing. The module 106 would then set the A429 landing gear "weight on wheels" to "on ground" and the A429 parking brake to "on" and the A664 engine control to "engines off" and the A825 control panel switch to "maintenance mode".

The ACT/ICD may provide the network model, the VAIS may provide the scripting model, and the OMS DET may provide the maintenance model of the aircraft at a specific configuration or block point. when any of these models change, the autogeneration tool can be rerun to generate the same functional integration testing scripts.

For example, if the landing gear system were changed to an Arinc 664 system, the network structure would change and the messages and parameters in the integration testing scripts would need to change accordingly. Once the autogeneration was run with the new network configuration, the new scripts can be updated as described above. Moreover, the maintenance model may limit the use of "maintenance mode" to certain phases of a flight.

The script autogeneration module 106 can determine that "maintenance mode" is only available during Power On and Taxi Out/In and not during Take Off, Climb, Cruise, Decent, and Go Around, and the generated scripts can identify those scenarios. During autogeneration of scripts, the consumer and producer of messages and parameters are checked for alignment.

For example, if the maintenance system consumes the "maintenance switch position" from the control panels, then the control panel must produce the "maintenance switch position" and the network must route into the maintenance system in the corresponding place in the network structure. The script autogeneration module 106 can then determine when there are mismatched consumers and producers and identify these for resolution, as described above in the context finding discrepancies from input files.

Figure 4:
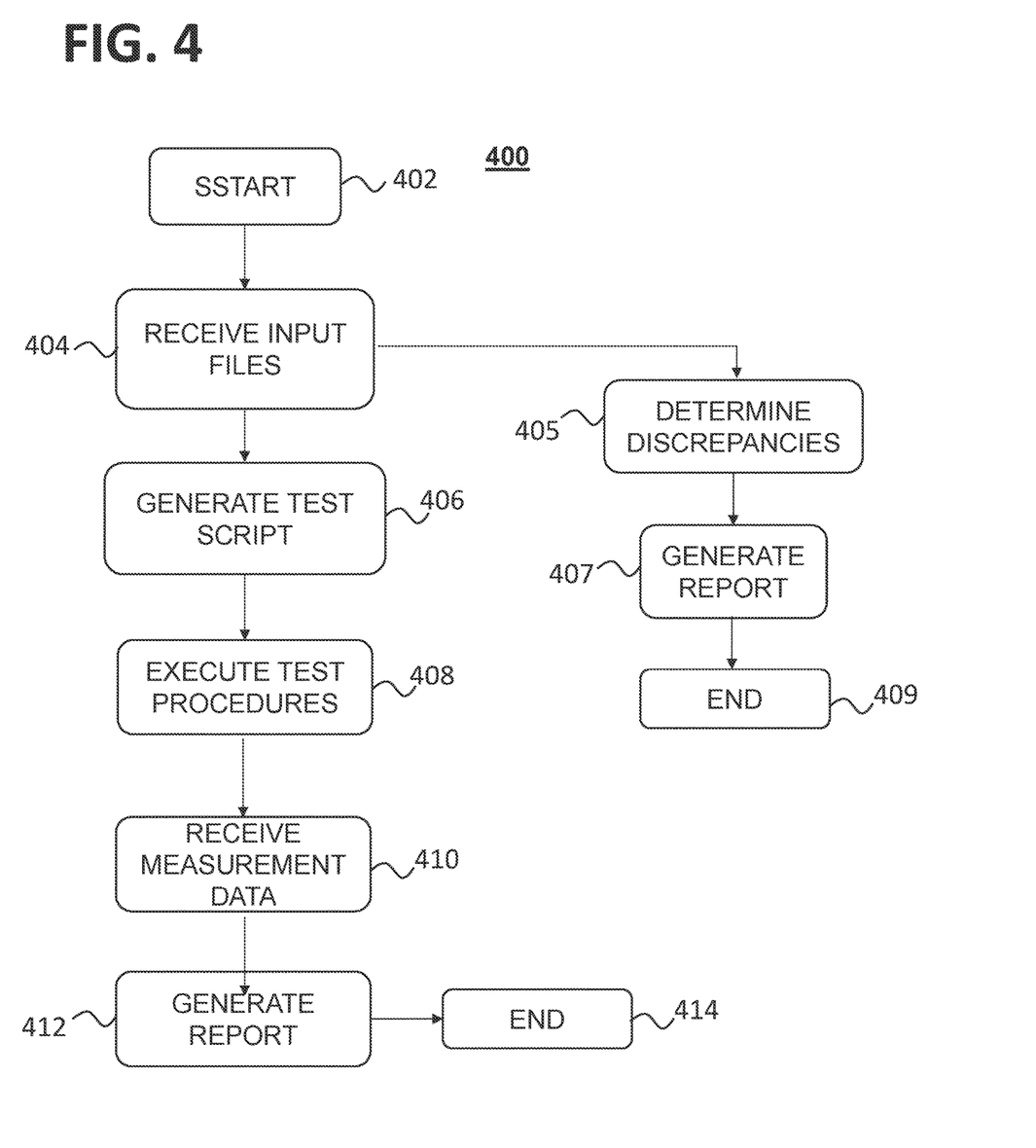
FIG. 4 illustrates an exemplary method of practicing an embodiment of the present disclosure.

Consistent with the examples discussed above, there is provided a method 400 for generating test scripts, test procedures obtained therefrom, and reports to assess component and system status, and reports that indicate one or more discrepancies in one or more input files. The method 400 begins at block 402. At block 404, the method 400 can include receiving by an application-specific processor (as discussed with respect to FIG. 3), one or more input files.

The method 400 may then include generating the test scripts at block 406 by the application-specific processor. This may be done by parsing the input files for one or more parameters and generating instructions capable of being executed by systems and subsystems associated with the asset under test. At block 408, the script may be fetched by the component or asset subsystem, and the procedures encoded therein may be executed. This may be, for example, determining whether the parking brake is on, whether a landing gear is down, and/or whether the one or pressure sensors are reporting values that are within a predetermined range.

At block 410, the subsystem may conduct measurements based on the test procedures. Once the procedures are exhausted, the method 400 may include generating a human-readable report including assessments and results based on the measurements (block 412). The method 400 may end at block 414.

In one alternate embodiment, the method 400 may include determining whether the input files have any discrepancies at block 405. At block 407, the method 400 may include generating a human-readable report indicating the discrepancies between input files. To find the discrepancies, the method 400 can include parsing hundreds of thousands of lines from the input files and identifying parameters and comparing them to determine whether they are encoded the same way in each file, for example. If the encoding does not match, the method 400 may flag the two files as having a discrepancy, which is then included in the report. The method 400 may then end at block 409.

Further aspects are provided by the subject matter of the following clauses.

A system communicatively coupled to a network including a plurality of aviation assets, includes a processor: a memory including instructions which when executed by the processor cause the processor to perform operations including: detecting a change in a state of the network, the change being characterized by comparing a previous state of the network with a current state of the network, and the change being associated with one or more assets of the plurality of assets: in response to detecting the change, fetching configuration data and test data from a plurality of sources: generating, based on the change, the configuration data, the test data, one or more verification scripts; and executing a specified test utilizing the one or more verification scripts, the specified test being configured to analyze one or more assets of the plurality of aviation assets.

The system according to any of the preceding clauses, wherein the operations further include executing the one or more verification scripts and in response to the executing, issuing a remedial action relating to the one or more assets.

The system according to any of the preceding clauses, wherein the plurality of sources includes a database storing maintenance configurations.

The system according to any of the preceding clauses, wherein the plurality of sources includes a database storing virtual aircraft integration system (VAIS) configurations.

The system according to any of the preceding clauses, wherein the plurality of sources includes a database storing aircraft configuration toolset (ACT) configurations.

The system according to any of the preceding clauses, wherein the plurality of sources includes a database storing test procedures, scripts, pass/fail criteria.

The system according to any of the preceding clauses, wherein the plurality of assets includes aircrafts or aircraft components.

The system according to any of the preceding clauses, wherein the operations includes determining the current state of the network based on information received from an aircraft network logic.

The system according to any of the preceding clauses, further including logging historical values of the information received from the aircraft network logic.

The system according to any of the preceding clauses, wherein the operations further include configuring the one or more verification scripts as templates for use in subsequent generations of future verification scripts.

A method of generating a verification script using a system interfaced with a network including a plurality of assets, the method comprises detecting a change in a state of the network, the change being characterized by comparing a previous state of the network with a current state of the network, and the change being associated with one or more assets of the plurality of assets: fetching configuration data and test data from a plurality of sources, the fetching being responsive to detecting the change: generating, based on the change, the configuration data, the test data, one or more verification scripts; and executing a specified test utilizing the one or more verification scripts, the specified test being configured to analyze one or more assets of the plurality of aviation assets.

The method according to any of the preceding clauses, further including executing the one or more verification scripts and issuing a remedial action relating to the one or more assets.

The method according to any of the preceding clauses, wherein the plurality of sources includes a database storing maintenance configurations.

The method according to any of the preceding clauses, wherein the plurality of sources includes a database storing virtual aircraft integration system (VAIS) configurations.

The method according to any of the preceding clauses, wherein the plurality of sources includes a database storing aircraft configuration toolset (ACT) configurations.

The method according to any of the preceding clauses, wherein the plurality of sources includes a database storing test procedures, scripts, pass/fail criteria.

A non-transitory tangible computer-readable medium including instructions for causing a processor to execute a test method on one or more aviation assets communicatively coupled to a network, the test method includes detecting a change in a state of the network, the change being characterized by comparing a previous state of the network with a current state of the network, and the change being associated with one or more assets of the plurality of assets; fetching configuration data and test data from a plurality of sources, the fetching being responsive to detecting the change; generating, based on the change, the configuration data, the test data, one or more verification scripts; and executing a specified test utilizing the one or more verification scripts, the specified test being configured to analyze one or more assets of the plurality of aviation assets.

The non-transitory tangible computer-readable medium according to any of the preceding clauses, wherein the plurality of assets includes aircrafts or aircraft components.

The non-transitory tangible computer-readable medium according to any of the preceding clauses, wherein the test method further includes determining the current state of the network based on information received from an aircraft network logic.

The non-transitory tangible computer-readable medium according to any of the preceding clauses, wherein the test method further includes logging historical values of the information received from the aircraft network logic and w configuring the one or more verification scripts as templates for use in subsequent generations of future verification scripts.

This written description uses examples to disclose the present disclosure, including the best mode, and also to enable any person skilled in the art to practice the disclosure, including making and using any devices or systems and performing any incorporated methods.

The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of generating a verification script using a system interfaced with a network including a plurality of aviation assets, the method comprising:
   detecting a change in a state of the network, the change being characterized by comparing a previous state of the network with a current state of the network, and the change being associated with one or more assets of the plurality of aviation assets, the plurality of aviation assets includes an aircraft or an aircraft component;
   fetching configuration data and test data from a plurality of sources, the fetching being responsive to detecting the change, wherein the plurality of sources includes:
      a database storing maintenance configurations, the maintenance configurations being related to a maintenance model of the aircraft, ground test, parameter acquisition, and fault reporting;
      a database storing virtual aircraft integration system (VAIS) configurations, the VAIS configurations being related to a scripting model;
      a database storing aircraft configuration toolset (ACT) configurations, the ACT configurations relating to a network model; and
      a database storing test procedures, scripts, or pass/fail criteria obtained in a previous cycle;
   generating one or more verification scripts based on the change, the configuration data, and the test data; and
   executing a specified test utilizing the one or more verification scripts, the specified test being configured to set an input value of a sensor of the one or more assets of the plurality of aviation assets and, based on an output of the sensor and an auto-generated criteria, determine whether the specified test passed.

2. The method of claim 1, further including executing the one or more verification scripts and issuing a remedial action relating to the one or more aviation assets.

3. A system communicatively coupled to a network including a plurality of aviation assets, comprising:
   a processor;
   a memory including instructions which when executed by the processor cause the processor to perform operations including:
   detecting a change in a state of the network, the change being characterized by comparing a previous state of the network with a current state of the network, and the change being associated with one or more assets of the plurality of aviation assets, the plurality of aviation assets includes an aircraft or an aircraft component;
   fetching configuration data and test data from a plurality of sources, the fetching being responsive to detecting the change, wherein the plurality of sources includes:
      a database storing maintenance configurations, the maintenance configurations being related to a maintenance model of the aircraft, ground test, parameter acquisition, and fault reporting;
      a database storing virtual aircraft integration system (VAIS) configurations, the VAIS configurations being related to a scripting model;
      a database storing aircraft configuration toolset (ACT) configurations, the ACT configurations relating to a network model; and
      a database storing test procedures, scripts, or pass/fail criteria obtained in a previous cycle;
   generating one or more verification scripts based on the change, the configuration data, and the test data; and
   executing a specified test utilizing the one or more verification scripts, the specified test being configured to set an input value of a sensor of the one or more assets of the plurality of aviation assets and, based on an output of the sensor and an auto-generated criteria, determine whether the specified test passed.

4. The system of claim 3, wherein the operations further include executing the one or more verification scripts and in response to the executing, issuing a remedial action relating to the one or more aviation assets.

5. The system of claim 3, wherein the operations include determining the current state of the network based on information received from an aircraft network logic.

6. The system of claim 5, further including logging historical values of the information received from the aircraft network logic.

7. The system of claim 3, wherein the operations further include configuring the one or more verification scripts as templates for use in subsequent generations of future verification scripts.

8. A non-transitory tangible computer-readable medium including instructions for causing a processor to execute a test method on one or more assets of a plurality of aviation assets communicatively coupled to a network, the test method comprising:
   detecting a change in a state of the network, the change being characterized by comparing a previous state of the network with a current state of the network, and the change being associated with the one or more assets of the plurality of aviation assets, the plurality of aviation assets includes an aircraft or an aircraft component;

fetching configuration data and test data from a plurality of sources, the fetching being responsive to detecting the change, wherein the plurality of sources includes:
- a database storing maintenance configurations, the maintenance configurations being related to a maintenance model of the aircraft, ground test, parameter acquisition, and fault reporting;
- a database storing virtual aircraft integration system (VAIS) configurations, the VAIS configurations being related to a scripting model;
- a database storing aircraft configuration toolset (ACT) configurations, the ACT configurations relating to a network model; and
- a database storing test procedures, scripts, or pass/fail criteria obtained in a previous cycle;

generating one or more verification scripts based on the change, the configuration data, and the test data; and executing a specified test utilizing the one or more verification scripts, the specified test being configured to set an input value of a sensor of the one or more assets of the plurality of aviation assets and, based on an output of the sensor and an auto-generated criteria, determine whether the specified test passed.

9. The non-transitory tangible computer-readable medium of claim 8, wherein the test method further includes determining the current state of the network based on information received from an aircraft network logic.

10. The non-transitory tangible computer-readable medium of claim 8, wherein the test method further includes logging historical values of the information received from an aircraft network logic and configuring the one or more verification scripts as templates for use in subsequent generations of future verification scripts.

* * * * *